United States Patent
Kölblin et al.

(10) Patent No.: US 6,516,364 B1
(45) Date of Patent: Feb. 4, 2003

(54) METHOD FOR TIME COORDINATION OF THE TRANSMISSION OF DATA ON A BUS

(75) Inventors: Robert Kölblin, Lörrach (DE); Wolfgang Bott, Ötigheim (DE)

(73) Assignee: Endress+Hauser GmbH+Co., Maulburg (DE)

(*) Notice: Subject to any disclaimer, the term of this patent is extended or adjusted under 35 U.S.C. 154(b) by 0 days.

(21) Appl. No.: 09/571,229

(22) Filed: May 16, 2000

(30) Foreign Application Priority Data

Jun. 8, 1999 (DE) ........................... 199 26 075

(51) Int. Cl.$^7$ .................. G06F 13/00; G06F 1/04; H04L 12/413
(52) U.S. Cl. .............. 710/100; 710/106; 713/601; 370/445
(58) Field of Search ............. 710/100, 61, 106, 710/124, 125, 117, 118; 713/400, 401, 500–601; 370/445, 503, 447, 461

(56) References Cited

U.S. PATENT DOCUMENTS 4,241,418 A * 12/1980 Stanley ....................... 327/141
4,881,165 A * 11/1989 Sager et al. ............. 340/825.2
6,032,282 A *  2/2000 Masuda et al. ............ 713/500
6,397,312 B1 *  5/2002 Nakano et al. ............. 365/193

* cited by examiner

Primary Examiner—Rupal Dharia
Assistant Examiner—Trisha Vu
(74) Attorney, Agent, or Firm—Bose McKinney & Evans LLP

(57) ABSTRACT

In a method for time coordination of the transmission of cyclic data values on a bus to which data transmitters and data receivers are connected, each data transmitter is assigned a cycle time in which it periodically transmits its data values, wherein the cycle times are integer multiples of a minimum cycle time. Furthermore, each data value is assigned a delay time related to the start of the cycle time of its data transmitter. A synchronization message is transmitted via the bus to each data transmitter with a period corresponding to the cycle time of the respective data transmitter and has a phase which is specific for the data transmitter with respect to the start of the minimum cycle time. The reception of its synchronization message in each data transmitter initiates the transmission of its data values with the respective delay time.

5 Claims, 2 Drawing Sheets

METHOD FOR TIME COORDINATION OF THE TRANSMISSION OF DATA ON A BUS

FIELD OF THE INVENTION

The invention relates to a method for time coordination of the transmission of cyclic data values on a bus to which data transmitters, which cyclically repeatedly transmit a predetermined number of data values, and data receivers are connected.

BACKGROUND OF THE INVENTION

Digital devices are used for serial transmission of data in technical fields. For example, this applies to data transmission in motor vehicles and in measurement and control engineering for information interchange between measurement devices (data transmitters) and controllers (data receivers). The bus used in this case is a so-called CSMA/CA bus, that is to say a bus referred to in the specialist literature as a Carrier Sense Multiple Access/Collision-Avoidance bus. A bus which generally has two conductors is used for serial data transmission. During typical operation of the bus, a large amount of data is transmitted cyclically from the measurement devices to the controllers. Apart from measurement devices, actuators such as pumps, valves and the like may also be connected to the bus. With the present bus standard, there is no control of the timing of accesses by individual bus subscribers to the bus. Each subscriber just waits for a minimum time when the bus is quiet, and transmits its data message once this time has elapsed. This can lead to so-called "bursts", that is to say a very large number of messages are transmitted in a very short time. Such a flood of data can lead to the processor modules in some bus subscribers being overloaded. In an extreme situation, this can even lead to loss of data, since received messages are not received.

SUMMARY OF THE INVENTION

The invention is based on the object of specifying a method using which data values can be transmitted in a time-coordinated manner while avoiding overload situations.

This object is achieved according to the invention by a method for time coordination of the transmission of cyclic data values on a bus to which data transmitters, which cyclically repeatedly transmit a predetermined number of data values, and data receivers are connected, in which a) each data transmitter is assigned a cycle time in which it periodically transmits its data items, wherein the cycle times are integer multiples of a minimum cycle time, b) each data value is assigned a delay time which is related to the start of the cycle time of its data transmitter, c) a synchronization message is transmitted via the bus to each data transmitter with a period corresponding to the cycle time of the respective data transmitter and has a phase which is specific for the data transmitter with respect to the start of the minimum cycle time, and the reception of its synchronization message in each data transmitter initiates the transmission of its data values with the respective delay time, and d) monitoring times which are dependent on cycle times are defined in each data receiver, in which monitoring times the data receivers listen to the bus in order to receive the transmitted data values.

The use of the method according to the invention avoids the data transmitters starting to transmit their data values to the bus virtually at the same time. Instead of this, the data values are transmitted via the bus with a time delay corresponding to the associated cycle and delay times and corresponding to the phase of the respective cycle time with respect to the minimum cycle time, so that said so-called bursts can no longer occur which, although not regarded as a fault situation according to the currently applicable standard, nevertheless can lead to an excessive bus load, and in some circumstances even to loss of data.

Advantageous developments of the invention are described in the dependent claims.

An exemplary embodiment of the method according to the invention will now be explained in more detail, with reference to the drawing, in which:

DETAILED DESCRIPTION OF THE DRAWINGS

Figure 1:
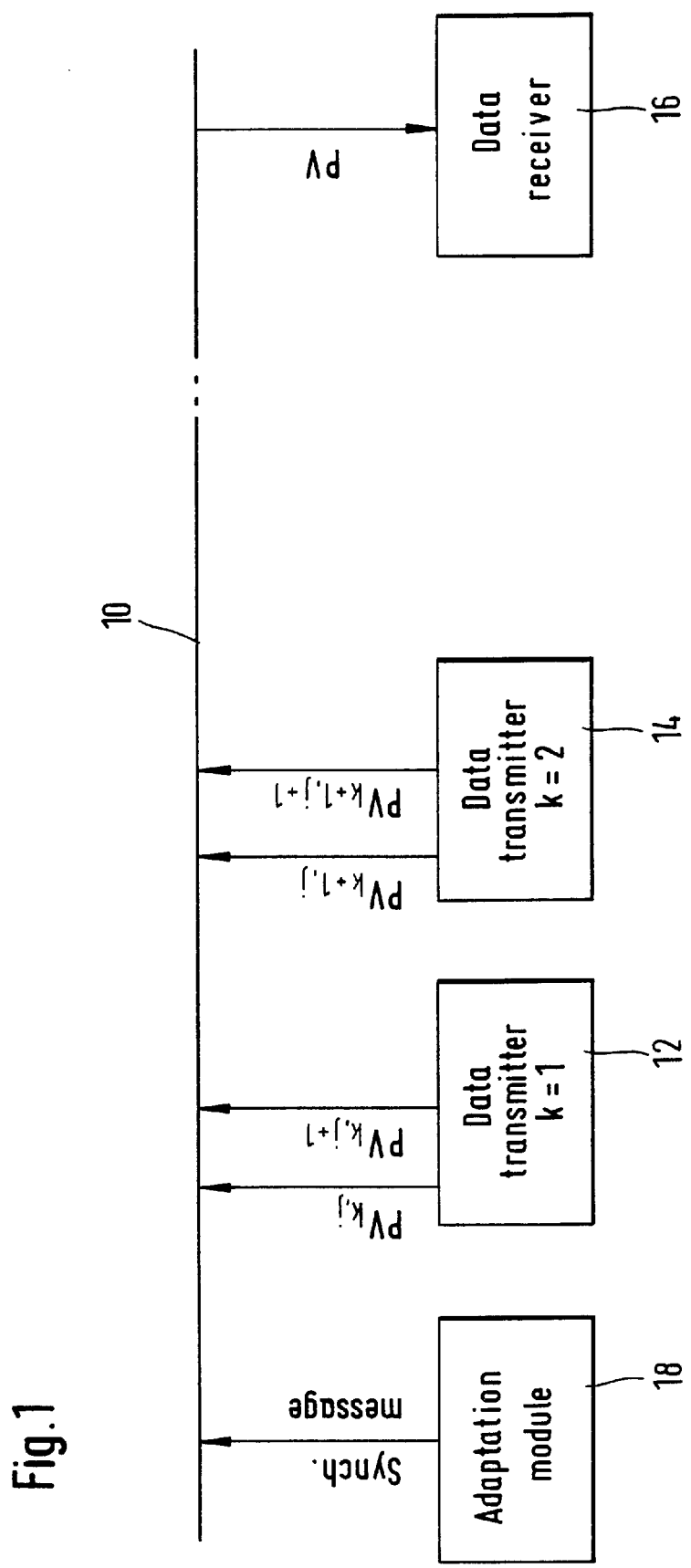
FIG. 1 shows a schematic illustration of a bus having data transmitters and data receivers connected to it.

FIG. 1 shows a section of a bus 10 to which a plurality of data transmitters 12, 14 and at least one data receiver 16 are connected. An adaptation module 18 is also connected to the bus 10, and its purpose will be explained later. For definition reasons, the data transmitters 12, 14 are assigned the order designations k=1, k=2, etc. to k=M, where M is the number of data transmitters connected to the bus.

The data transmitters 12, 14 produce data values which they emit cyclically to the bus. These data values are denoted by $PV_{k,j}$, $PV_{k,i+1}$, . . . for the k-th data transmitter 12, and $PV_{k+1,j}$, $PV_{k+1,j+1}$, . . . for the k+1-th data transmitter 14.

For time coordination of the transmission of data values, the number of data values PV which each data transmitter is intended to transmit cyclically repeatedly is first of all defined. Each data transmitter is then assigned a cycle time $T_{Ck}$, that is to say the cycle time $T_{C1}$ is assigned to the first data transmitter, $T_{C2}$ is assigned to the second data transmitter, etc., wherein the cycle times $T_{Ck}$ may also be equal. The cycle times are in this case integer multiples of a minimum cycle time $T_{Cmin}$ which is assigned to the first data transmitter.

Each data value is then assigned a delay time $T_V$ which defines the time from the start of the cycle time $T_{Ck}$ assigned to the relevant data transmitter at which the respective data value $PV_{k,j}$ is intended to be transmitted to the bus. Thus, for example, the first data value $PV_{1,1}$ of the first data transmitter is assigned the delay time $T_{V1,1}$, and the second data value $PV_{1,2}$ of the first data transmitter is assigned the delay time $T_{V1,2}$ . . . , while the first data value $PV_{2,1}$ of the second data transmitter is assigned the delay time $T_{V2,1}$, and the second data value $PV_{2,2}$ of the second data transmitter is assigned the delay time $T_{2,2}$ . . . , etc.

For each data transmitter, the adaptation module 18 applies a synchronization message (which is specifically addressed to it) to the bus which, on reception in the associated data transmitter defines the start of the respective cycle time. These synchronization messages have a predetermined phase shift with respect to the synchronization message transmitted for the first data transmitter, so that each synchronization message has a specific phase with respect to this start of the first synchronization message. This means that the cycle times of the individual data transmitters start with a predetermined phase shift with respect to the start of the cycle time of the first data transmitter. The cycle times of the various data transmitters thus do not start simultaneously, but are likewise phase-shifted corresponding to the phase shift of the synchronization messages. The time interval between the start of a cycle time and the start of the cycle time assigned to the first data transmitter is referred to in the following text as the phase time $t_{phase}$ of the respective cycle.

Figure 2:
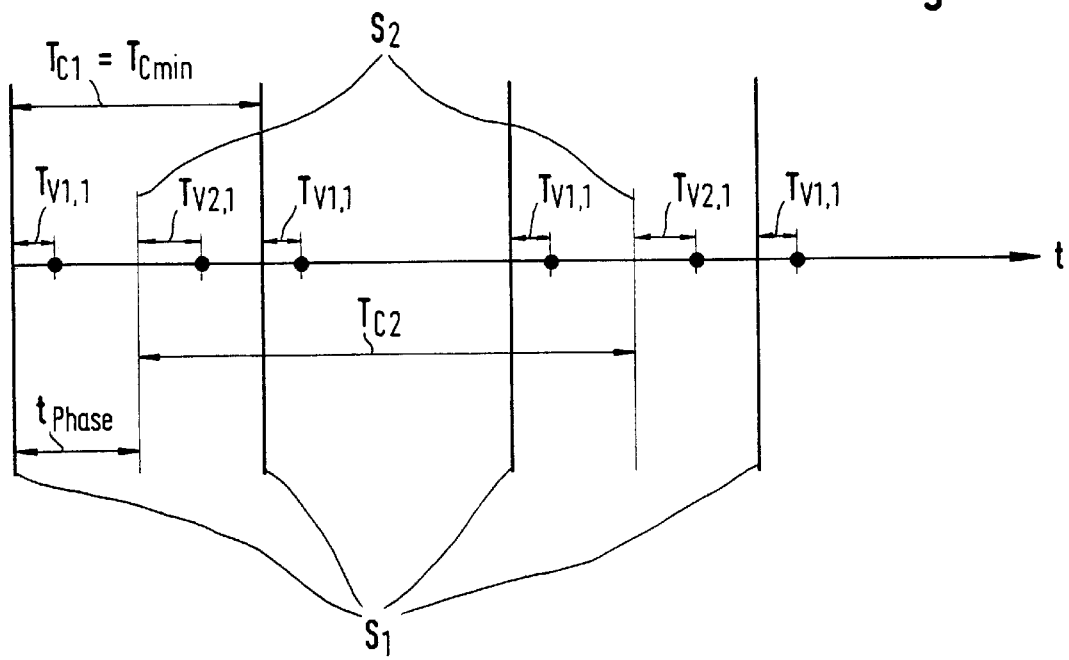
FIG. 2 shows a timing diagram to illustrate data transmission from data transmitters with different cycle times.

FIG. 2 uses a timing diagram to show, in general form, how the cycle times, the delay times and the phase times of two data transmitters and their data values are located relative to one another on the time axis. Thick vertical lines denote those times at which the adaptation module 18 transmits the synchronization message S1 for the first data transmitter (k=1). The transmission is made periodically in time with the cycle time $T_{C1}$ of the first data transmitter. The thin vertical lines denote those times at which the adaptation module 18 transmits the synchronization messages S2 for the second data transmitter (k=2). These synchronization messages are transmitted periodically in time with the cycle time $T_{C2}$ for the second data transmitter. The cycle time $T_{C1}$ of the first data transmitter is the minimum cycle time $T_{Cmin}$, and the cycle time $T_{C2}$ for the second data transmitter is an integer multiple of the minimum cycle time where, in the described example:

$$T_{C2} = 2T_{Cmin} = 2T_{C1}.$$

As can be seen in FIG. 2, the synchronization message for the second data transmitter is transmitted with a time offset of $t_{phase}$ with respect to the start of the minimum cycle time of the first data transmitter.

For the schematic explanation, it is assumed that both the first data transmitter and the second data transmitter are each intended to emit only one data value to the bus. The data value of the first data transmitter is assigned a delay time $T_{V1,1}$, which means that this data value is always transmitted with this time delay after reception of the synchronization message. This is indicated by a small black dot on the time axis. In the same way, the data value of the second data transmitter is also assigned a delay time $T_{V2,1}$ which means that this data value is transmitted with a delay of $T_{V2,1}$ with respect to the synchronization message that starts the time cycle $T_{C2}$. This is indicated in FIG. 2 by the large black dot on the time axis.

Owing to the time offset of both the cycle times and the transmission times of the data values, it is no longer possible for the bus to be overloaded by numerous data values being transmitted virtually simultaneously.

An explanation will now be given of how the coordination method described above can be used in practice.

Various definitions are required for the described exemplary embodiment for this purpose:

1. Definition of the Cycle Time

The minimum cycle time $T_{Cmin}$ is a multiple of a reference time $T_{Cref}$, which is 10 ms. Thus:

$$T_{Cmin} = v \cdot T_{Cref}, \quad v=\text{natural number}$$

where 50 ms $\leq T_{Cmin} < 3$ s.

In order to define the upper limit, it is important that the timers in the processors do not have an undefined dynamic with regard to the achievable intervals and that the individual modules on the bus continue to operate autonomously if the synchronization messages from the adaptation module fail, and that the maximum number of data values which can be transmitted is defined by the longest cycle for a given, fixed bandwidth. If $T_{Cmin}=3$ s, the maximum number of data values which can be transmitted in a given segment of the bus is 3000 for an assumed basic transmission rate (bandwidth) of one data value per ms.

The defined cycle time applies to each of the data values of a module on the bus.

By definition, a maximum of ten different cycle times $T_{Ck}$ (k=1 ... 10) is permissible in one bus segment.

The cycle times $T_{Ck}$ of the modules are integer multiples of the minimum cycle time $T_{Cmin}$, and they are quoted as multiples of $T_{Cref}=10$ ms, that is to say:

$$T_{Ck} = i \cdot T_{Cmin} = i \cdot v \cdot T_{Cref}, \quad i=\text{natural number}$$

The product i·v is a parameter that is transmitted with the synchronization message.

For a maximum cycle time of $T_{Ck}=3$ s and a reference time $T_{Cref}$ of 10 ms, the value of i·v is between 1 and 300, that is to say, in principle, 300 different cycle times are possible.

2. Definitions of the Delay Times for the Data Values

Each data value j of a cycle time $T_{Ck}$ has an associated delay time $T_{vk,j}$, where $T_{vk,j} < T_{Ck}$. The delay time $T_{vk,j}$ is related to the respective synchronization message and may be an integer multiple of 1 ms (integer multiples of $T_{Cmin}$ are not allowed in this case).

After receiving its synchronization message, each data transmitter resets its internal timer and raises it to the delay time for the first data value to be transmitted.

The data transmitter must not transmit the relevant data value j until this delay time $T_{vk,j}$ has elapsed. After this, the timer is raised by the difference to the next delay time and, once this difference time has elapsed, the next data value is transmitted. When the last data value to be transmitted is reached, the timer is raised to the remaining time until the end of the complete cycle time $T_{Ck}$ plus the first delay time. This results in the data transmitter being able to continue operating even if there is no synchronization message.

3. Definitions of the Monitoring Time in the Data Receivers

For each data value y to be received by a data receiver there is a monitoring time, which is derived from the cycle time $T_{Ck}$ of the data value x to be applied by a data transmitter to the bus, as follows:

$$T_0(y) = 2 \ldots 3 \cdot T_{Ck}(x)$$

4. Definitions of the Phase Times for the Synchronization Messages

Each synchronization message associated with a cycle time has a fixed defined phase and thus a fixed phase time within the cycle $T_{Cmin}$ with the minimum cycle time. The phase times are quoted as multiples of 1 ms. The numerical allocation of the times is carried out by analyzing the load levels on the bus. The procedure for data value transmission coordination is based on the proposed model that a certain bandwidth B is available for transmission of the data values, and this bandwidth B must be shared between the data values. In the case of a bus, for example a CAN bus, with 500 kBit/s and a 30% load level for cyclic values (5 bytes of wanted data), this results in B=1/(time per data value)= approximately 1 data value/ms.

For a cycle time $T_{Ck}=i \cdot T_{Cmin}$ of a data value with the i-th multiple of the minimum cycle time $T_{Cmin}$ this results in only the i-th element of the bandwidth B.

With regard to the bandwidth being shared between the individual cycle times $T_{Ck}$, it can thus be said that:

$$B \geq \sum_{k=1}^{M} (\text{number } N_{Ck} \text{ of PVs with the cycle time } T_{Ck})/(\text{cycle time } T_{Ck}) \text{ and}$$

$$B \geq \sum_{k=1}^{M} N_{Ck}/T_{Ck} = \sum_{k=1}^{M} N_{Ck}/(i_k \cdot T_{Cmin}) \text{ and}$$

$$T_{Cmin} \geq \sum_{k=1}^{M} N_{Ck}/(i_k \cdot B)$$

In this case, M indicates the number of different cycle times (k=1 ... M≦10).

If this condition is contravened, then the bus is overloaded, and the following options are available to reduce the load level:

increase the individual cycle times $T_{Ck}$ or else the minimum cycle time $T_{Cmin}$ reduce the number $N_{Ck}$ of data values in one cycle time.

EXAMPLE

| Bus load level analysis | | | | | | | | | | |
|---|---|---|---|---|---|---|---|---|---|---|
| Min. cycle time $T_{cmin}$ [ms]: | 100 | | | | | | | | | |
| Cycle number k | 1 | 2 | 3 | 4 | 7 | 6 | 7 | 8 | 9 | 10 |
| Multiple $T_{cmin}$ (=i) | 1 | 3 | 2 | 5 | | | | | | |
| Cycle time [ms] | 100 | 300 | 200 | 500 | | | | | | |
| Number of data values | 50 | 10 | 25 | 90 | 0 | 0 | 0 | 0 | 0 | 0 |
| Bus load level [%] | 50 | 3.333 | 12.5 | 18 | 0 | 0 | 0 | 0 | 0 | 0 |

$$T_{Cmin} = 100 \text{ ms} \geq \sum_{k=1}^{M} N_{Ck}/(i \cdot B)$$

$$= 50 \text{ PV}/(1 \cdot 1 \text{ PV/ms}) + 10 \text{ PV}/(3 \cdot 1 \text{ PV/ms}) +$$
$$25 \text{ PV}/(2 \cdot 1 \text{ PV (ms)}) + 90 \text{ PV}/(5 \cdot 1 \text{ PV/ms})$$
$$= 50 \text{ ms} + 3.33 \text{ ms} + 12.5 \text{ ms} + 18 \text{ ms}$$
$$= 83.83 \text{ ms}$$

It is evident from this that the load level of the bus from cyclic data values is not that great, amounting to 83.83 ms/100 ms=83.83% of the allocated bandwidth.

Configuration of the Phase and Delay Times

1. Configuration of the Phase Times

The following text describes how the phase times $t_{phase,k}$ of the synchronization messages are determined. This determination process is directly coupled to the bus load level analysis. This means that the phase time of the synchronization message with respect to the cycle time $T_{Ck}$ reflects the already used element of the data values from the previous cycle times in the bandwidth.

If $N_{Ck}$ data values have to be transmitted with the cycle time $T_{Ck}$, then the element of the data values to be transmitted in each minimum cycle time is exactly $N_{Ck}/i$. Since this value is not always an integer, it needs to be rounded up, resulting in the element $n_{Ck}$ of the data values with the cycle time $T_{Ck}$ which must be transmitted in the minimum cycle (number of spaces to be occupied in the minimum cycle).

$$n_{Ck} = \begin{cases} N_{Ck} \text{ div } i & \text{for } N_{Ck} \text{ mod } i = 0 \\ N_{Ck} \text{ div } i + 1 & \text{else} \end{cases}$$

then, for the phase times:

$t_{phase,1}=0$ $t_{phase,k}=t_{phase,k-1}+n_{Ck-1}/B$ for k=2 ... M, where M is the number of different cycle times (M≦10).

The phase time $t_{phase,M+1}$ thus reflects the total bandwidth element used so that, for the bus load level analysis:

$$T_{phase,M+1} \leq T_{Cmin} \rightarrow \text{load level satisfactory}.$$

2. Configuration of the Delay Times

The process of determining the delay times for the $N_{Ck}$ data values with the cycle time $T_{Ck}$ is carried out in such a way that only $n_{Ck}$ data values may be transmitted within the minimum cycle corresponding to its bandwidth element. The $n_{Ck}$ data values are thus distributed over i minimum cycle times $T_{Cmin}$, and the associated delay times differ by a multiple of $T_{Cmin}$. The determination of the delay time for the j-th data value with the cycle time $T_{Ck}=i \cdot T_{Cmin}$ and thus the occupancy of the bandwidth element may be regarded as occupancy of a space $T_{k,j}$ where $t_{phase,k} < T_{k,j} \leq t_{phase,k+1}$ in the minimum cycle. The space to be occupied is defined as follows:

$$\tau_{k,j} = [(j-1) \text{ mod } n_{Ck}] \cdot 1 \text{ ms} + 1 \text{ ms} + t_{phase,k} \text{ for } j=1 \ldots N_{Ck}$$

There are a maximum of $B \cdot T_{Cmin}$ spaces which can be occupied in the minimum cycle. Each space may in this case be filled only with data values whose cycle time is $T_{Ck}=i \cdot T_{Cmin}$ and this may be done up to i-times, that is to say with a maximum of i data values.

The delay time $T_{vk,j}$ for the j-th data value with the cycle time $T_{Ck}=i \cdot T_{Cmin}$ is related to the synchronization message and is determined as follows:

$$T_{vk,j} = \tau_{k,j} + (0 \ldots i-1) \cdot T_{Cmin} - t_{phase,k} \text{ and}$$

$$T_{vk,j} = [(j-1) \text{ div } n_{Ck}] \cdot T_{Cmin} + [(j-1) \text{ mod } n_{Ck}] \cdot 1 \text{ ms} + 1 \text{ ms for } j=1 \ldots N_{Ck}$$

In the above formulae, "mod" is the modulo operation (for example 5 mod3=2), and "div" is integer division (for example 5 div3=1).

It can be seen that each space $\tau_{k,j}$ is occupied a maximum of i-times or, in other words, a maximum of i−1 data values remain unoccupied in a used space, and may be referred back to, if necessary, if the bus section is expanded. Thus, for the entire occupied bandwidth $t_{occupied,total}$:

$$t_{occupied,total} = \max_{k,j}\{\tau_{k,j}\} \text{ where } j=1 \ldots N_{Ck}, k=1 \ldots M$$

and, finally, for the bus load level analysis $$t_{occupied,total} \leq T_{Cmin}.$$

Example: If $T_{Cmin}=100$ ms

| | | |
|---|---|---|
| Cycle time $T_{Ck}$ | $T_{C1} = 100$ ms | $T_{C2} = 200$ ms |
| Number PVs $N_{Ck}$ | $N_{C1} = 4$ | $N_{C2} = 3$ |
| Number PVs $n_{Ck}$ in the minimum cycle | $N_{C1} = 4$ | $N_{C2} = \text{int}(3/2 + 1) = 2$ |
| Phase time $t_{phase,k}$ | $T_{phase,1} = 0$ ms | $T_{phase,2} = 4$ ms |

-continued

| | | |
|---|---|---|
| Space in min. cycle $\tau_{k,j}$ | $\tau_{k=1,j=1,2,3,4} =$ 1,2,3,4 ms | $\tau_{k=1,j=1,2,3} =$ 5,6,5 ms |
| Delay time $T_{vk,j}$ | $T_{vk=1,j=1,2,3,4} =$ 1,2,3,4 ms | $T_{vk=1,j=1,2,3} =$ 1,2,101 ms |

Thus, for the bus load level analysis (see above):

$$T_{phase,M+1} = t_{occupied,total} = 6 \text{ ms} \leq T_{Cmin} = 100 \text{ ms}.$$

Figure 3:
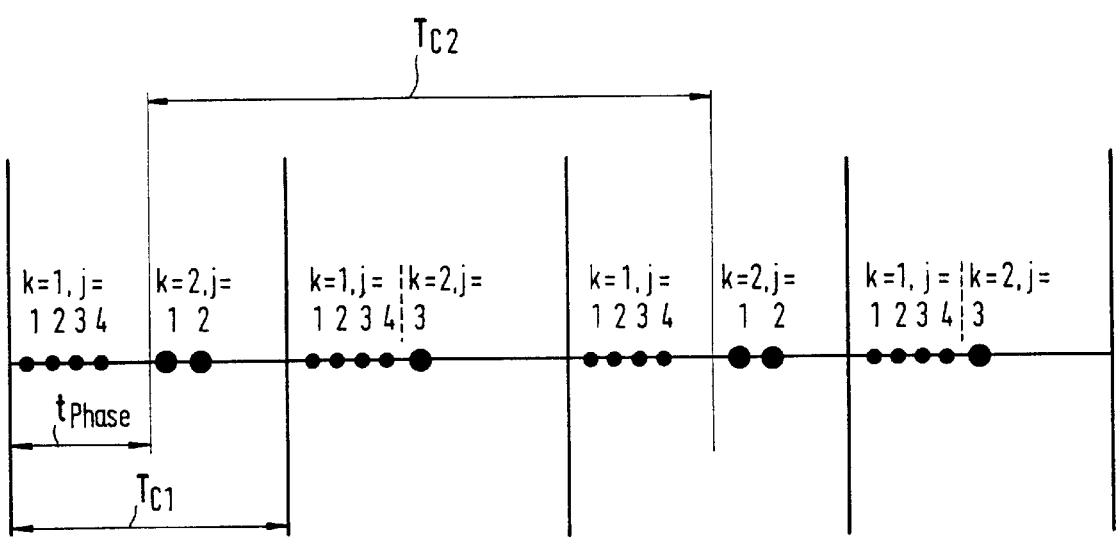
FIG. 3 shows a similar diagram to that in FIG. 2, for a specific numerical example.

FIG. 3 shows the timing for the transmission of data values using the parameters mentioned in the above example. In this case, it is evident that, after the start of the first cycle $T_{C1}$, four data values are transmitted successively, with the minimum cycle time, and with delay times at intervals of 1 ms each. The start of the cycle with the second cycle time $T_{C2}$ starts with a phase shift of $t_{phase}$ within the first minimum cycle $T_{C1}$, that is to say with a phase shift of 4 ms and, after the start of this cycle, two data values with the delay times 1 ms and 2 ms with respect to the start of the cycle are first of all transmitted, with the second cycle time $T_{C2}$. The third data value in the cycle with the cycle time $T_{C2}$ is transmitted with a delay time of 101 ms with respect to the start of the cycle time $T_{C2}$. With respect to the start of the second cycle with the cycle time $T_{C1}$, the transmitted third data value is located in fifth place after the four data values which were transmitted after the start of this second cycle.

As can be seen in the diagram in FIG. 3, the data values which are transmitted by a data transmitter with the cycle time $T_{C2}$ are not transmitted immediately one after the other in the first cycle with the cycle time $T_{C1}$, but are distributed over a plurality of such cycles. This leads to the bus load being distributed better.

In the diagram of FIG. 3, the thick black lines each denote the start of the cycle with the minimum cycle time $T_{C1}$, with this start in each case being defined by the synchronization message for the data transmitter to which this minimum cycle time $T_{C1}$ is assigned. The thin vertical black lines denote the start of the cycle time $T_{C2}$ which is assigned to a second data transmitter, with the start being defined by the synchronization message for this second data transmitter.

When the described method is in use, the data values are transmitted by a plurality of data transmitters via a bus with accurate time coordination, in such a way that it is no longer possible for the bus to be overloaded by so-called bursts.

What is claimed is:
1. A method for time coordination of the transmission of cyclic data on a bus to which data transmitters, which cyclically repeatedly transmit a predetermined number of data items, and data receivers are connected, in which
   a) each data transmitter is assigned a cycle time ($T_c$) in which it periodically transmits its data values (PV), wherein the cycle times ($T_c$) are integer multiples of a minimum cycle time ($T_{Cmin}$),
   b) each data value (PV) is assigned a delay time ($T_v$) which is related to the start of the cycle time ($T_c$) of its data transmitter,
   c) a synchronization message is transmitted via the bus to each data transmitter with a period corresponding to the cycle time ($T_c$) of the respective data transmitter and has a phase ($t_{phase}$) which is specific for the data transmitter with respect to the start of the minimum cycle time ($t_{Cmin}$), and the reception of its synchronization message in each data transmitter initiates the transmission of its data values (PV) with the respective delay time ($T_v$), and
   d) monitoring times which are dependent on cycle times ($T_c$) are defined in each data receiver, in which monitoring times the data receivers listen to the bus in order to receive the transmitted data values (PV).

2. The method as claimed in claim 1, in which a timer is started in each data transmitter after it has received its synchronization message, and wherein the data values (PV) of each data transmitter are transmitted to the bus whenever their delay time ($T_v$) matches the time reached by the timer.

3. The method as claimed in claim 1, in which, in order to achieve a uniform bus load level by the data values (PV) from k data transmitters to which the cycle times $$T_{ck} = k \cdot T_{Cmin}$$

are assigned, within the minimum cycle time ($T_{Cmin}$) assigned to the first data transmitter only $$n_{Ck} = \begin{cases} N_{Ck} \text{ div } i & \text{for } N_{Ck} \text{ mod } i = 0 \\ N_{Ck} \text{ div } i+1 & \text{else} \end{cases}$$

$N_{ck}$: Number of data values (PV) to be transmitted by the k-th data transmitter i: Ratio of the k-th cycle time ($T_{ck}$) to the minimum cycle time ($T_{Cmin}$), data values (PV) are transmitted, while the remaining data values (PV) are transmitted, while the remaining data values (PV) are distributed between subsequent cycle times.

4. The method as claimed in claim 3, in which the following condition is satisfied in order to avoid overloading the bus:

$$T_{Cmin-} \geq \sum_{k=1}^{M} N_{Ck} / (i_k \cdot B)$$

where B is the bandwidth of the bus.

5. The method as claimed in claim 2, in which, in order to achieve a uniform bus load level by the data values (PV) from k data transmitters to which the cycle times $$T_{ck} = k \cdot T_{Cmin}$$

are assigned, within the minimum cycle time ($T_{Cmin}$) assigned to the first data transmitter only $$n_{Ck} = \begin{cases} N_{Ck} \text{ div } i & \text{for } N_{Ck} \text{ mod } i = 0 \\ N_{Ck} \text{ div } i+1 & \text{else} \end{cases}$$

$N_{ck}$: Number of data values (PV) to be transmitted by the k-th data transmitter i: Ratio of the k-th cycle time ($T_{ck}$) to the minimum cycle time ($T_{Cmin}$), data values (PV) are transmitted, while the remaining data values (PV) are transmitted, while the remaining data values (PV) are distributed between subsequent cycle times.

* * * * *